L. F. JOHNSON.
DYNAMO ELECTRIC MACHINE.
APPLICATION FILED MAY 19, 1913.
1,236,309.
Patented Aug. 7, 1917.
2 SHEETS—SHEET 2.
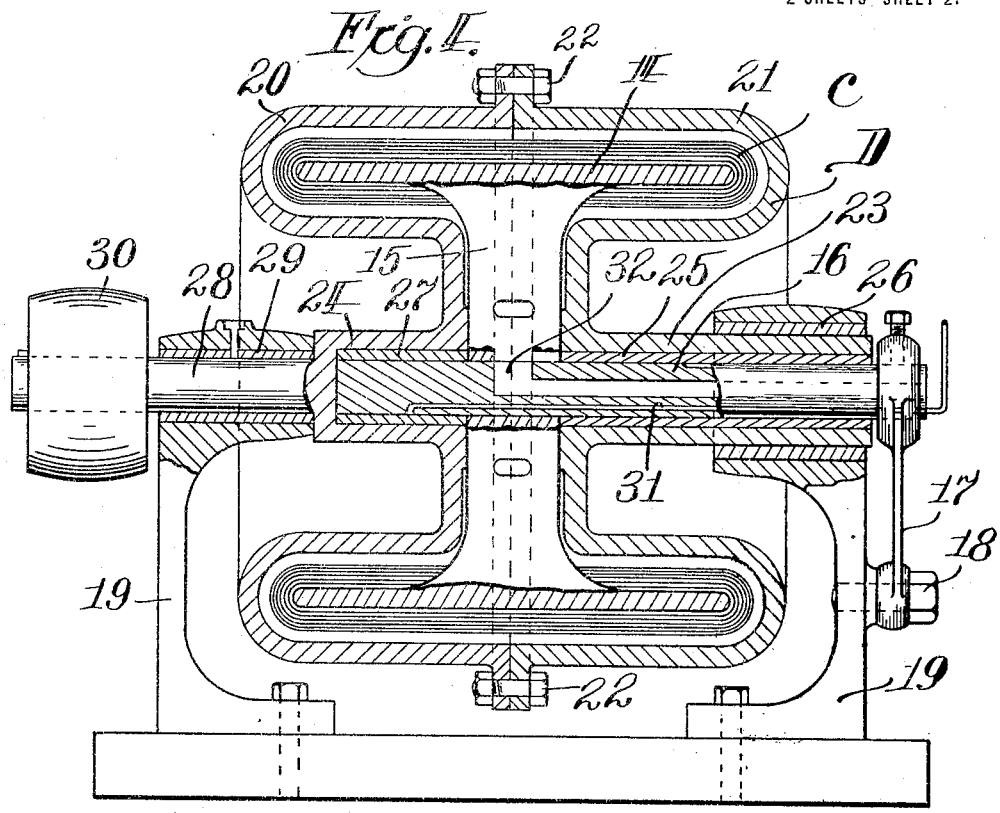
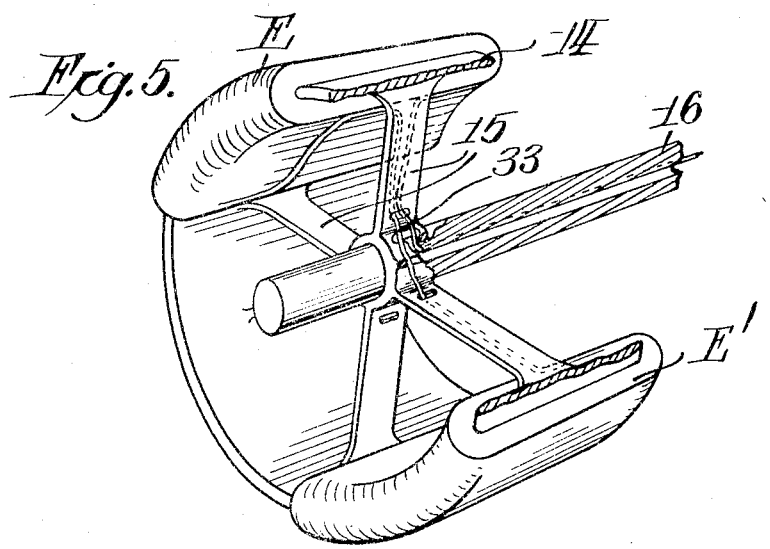
Witnesses:
Inventor:
Louis Frank Johnson,
by ............
Attorney.

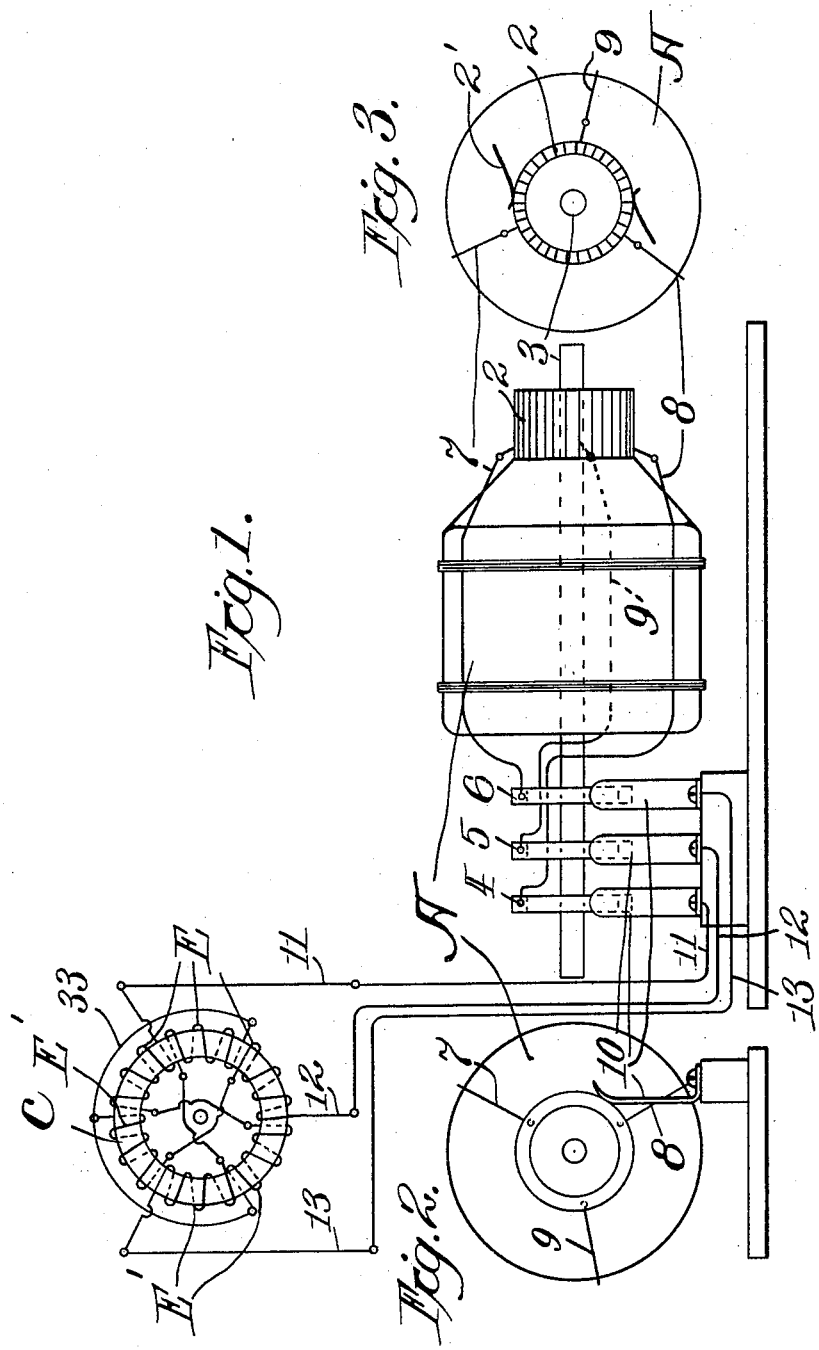

UNITED STATES PATENT OFFICE.

LOUIS FRANK JOHNSON, OF SAN GABRIEL, CALIFORNIA, ASSIGNOR, BY MESNE ASSIGNMENTS, TO POWER DEVELOPING COMPANY, A CORPORATION OF ARIZONA.

DYNAMO-ELECTRIC MACHINE.

1,236,309.　　　Specification of Letters Patent.　　Patented Aug. 7, 1917.

Application filed May 19, 1913. Serial No. 768,435.

*To all whom it may concern:*

Be it known that I, LOUIS FRANK JOHNSON, a citizen of the United States, residing at San Gabriel, in the county of Los Angeles and State of California, have invented a new and useful Improvement in Dynamo-Electric Machines, of which the following is a specification.

My invention relates to improvements in what I choose to term a dynamo electric machine, and has as its primary object a machine which is capable of producing a maximum amount of power from a minimum amount of energy. Another object of my invention is to produce an electric motor of the induction type, whose rotor is entirely free from winding, insulated bars, or electrical fittings of any kind.

In the accompanying drawings forming a part of this specification, Figure 1 is a diagrammatic view of my invention; Figs. 2 and 3 are diagrammatic end views of Fig. 1; Fig. 4 is a longitudinal section of my improved induction type motor, and Fig. 5 is a perspective of a detail illustrating the construction of the field of my improved induction type motor.

In the drawings A indicates an armature of an ordinary direct current motor, hereinafter referred to as the primary motor; having the usual commutator 2, provided with two sets of brushes 2'. The windings on the armature are connected to the commutator in the usual manner. 3 indicates the shaft of the armature, upon which three collector rings 4, 5, and 6 are carried. Connected to three of the commutator bars, situated at an equal distance apart circumferentially on the commutator are three lead wires, 7, 8, and 9, one of the said lead wires being connected to each of the said collector rings, being insulated from each other and from all other parts.

Each collector ring is provided with a brush 10, and to the brushes are attached suitable leads, 11, 12, and 13, which are carried to the field windings of one or more of my improved type of induction motors.

My improved induction type electric motor, hereinafter referred to as the secondary motor, has a field magnet C, and a rotor D (see Fig. 4). The field magnet consists of a circular piece or band of iron or other suitable material 14, which acts as a core, with wire wound on said core for magnetizing the same. This field core is mounted upon radial arms forming a spider 15, which is carried upon a stationary shaft 16, said shaft being held from turning by means of the arm 17, the end of which is secured by the bolt 18 to one of the journal supports 19 of the machine.

The rotor D incasing the field magnet is formed in two halves, 20 and 21, joined together by bolts 22, and journaled upon the stationary shaft 16, by means of the sleeves 23 and 24. The sleeve 23 of section 21 of the rotor has a brass sleeve 25 interposed between it and the stationary shaft, and another brass sleeve 26 placed in the journal support 19, by which that end of the sleeve is carried. Another journal sleeve 27 made of brass or other suitable material is interposed between the section 20 and the stationary shaft for the purpose of reducing friction when the rotor revolves upon the stationary shaft. The end of the sleeve 24 is formed with a gudgeon 28, which is suitably journaled in one of the journal supports 19, a brass sleeve 29 being placed in said journal support for reducing the friction between the gudgeon and its support. The outer end of the gudgeon carries a drive pulley 30, by means of which mechanical power may be transmitted from the machine when in operation. The bearings are to be lubricated through the oil passage 31 in the stationary shaft and the lead wires to the coils of the field are conducted through the duct 32 in the same shaft. By means of the construction described the rotor is adapted to revolve entirely outside of the field magnet, to confine and take advantage of all the lines of force produced by the magnetic circuit. It is not essential that the field magnet is entirely incased by the rotor in order to produce an operative structure; the alternative construction set forth in Fig. 6 illustrating a device constructed in accordance with my invention, in which the field is not entirely inclosed.

The field magnet of the secondary motor is adapted to be wound with six or more coils of wire. In the illustration six coils are employed, but this number may be varied to suit various conditions as desired without departing from the spirit of my invention, so long as there are two sections of winding on the said field magnet for each lead from the primary motor, as hereinafter stated.

The operation of my invention is as follows:—

The primary motor is operated in the usual manner, being supplied with direct current from an ordinary line circuit. There being three lead wires 7, 8, and 9 connected to its commutator at points equidistant from each other around its periphery, each lead therefore obtains an alternating current or impulse wave continuously changing its polarity. At any one position of the commutator, two of the leads are taking a current of one polarity, while the third lead is taking current of the opposite polarity and this condition is changed three times in each revolution of the commutator. In the field of the secondary motor this current is fed into a coil wound left handed. E representing one of the secondary motor field coils. The current from one of the leads on entering one of the sections of the field winding creates a magnetic density in that part of the core and then crosses over and acts in a similar manner on the winding and core, of the opposite section of the field winding E', each terminal section of the field winding E' being wound in a direction opposite to that of the leading section, 33 representing the connection between the said sections. The terminal of section E' connects with the collector ring 6, through the lead 13, thus completing the circuit back to the commutator through the connection 7. The coils are duplicated and connected in the same manner to each collector ring, and the action described thus takes place three times in the field windings during each revolution of the armature A of the primary motor. As a result there are three impulse waves of current produced, and these three impulse waves alternately combine and oppose each other, and as there are three pairs of sections of field windings and three changes of polarity in the current produced in each revolution of the primary armature A, there are therefore nine distinct changes in the intensity and polarity of the impulse waves of current continually following each other in sequence in the field windings of the secondary motor. A rotary magnetic field is thus set up by the three phase current traversing the Y connected field windings. This field induces currents in the solid metal of the rotor in the same manner as in induction motors with short circuited secondary windings, and the reaction of field and current exerts a torque on the rotor.

The direction of motion of the armature or rotor D or F, of the secondary motor is in accordance with the manner in which the coils in the field are connected. Reversing the connections causes the rotor to revolve in an opposite direction.

While the foregoing specification and the drawing describe and illustrate my invention as applied to a single unit group of one primary motor and one secondary motor, it will be understood that the primary motor may be considered as a motor generator provided with a three-wire circuit, to which may be connected any number of secondary motors, the number only being limited by the current generating capacity of the primary motor.

In accordance with the patent statutes I have described the principles and operation of my invention together with the apparatus which I now consider to represent the best embodiment thereof, but I desire to have it understood that the construction shown is only illustrative and that the invention can be carried out by other means and applied to uses other than those above set forth within the scope of the following claims.

Having described my invention, what I claim as new and desire to protect by Letters Patent is:—

1. An induction motor, comprising, in combination, a field having a stationary core and an inducing winding thereon, and a rotor having a sectional incasement of conductive material entirely inclosing and arranged to be rotatably influenced by said field, each of the sections of said rotor having an inwardly extending member journaled to revolubly support said rotor.

2. An induction motor, comprising, in combination, a field having a circular stationary core and an inducing winding thereon, and a rotor arranged to be rotatably influenced by said field and having an incasement of conductive material coaxial with and entirely inclosing said field, each of the sections of said rotor having an inwardly extending member revolubly mounted.

In testimony whereof, I have signed my name to this specification, in the presence of two subscribing witnesses.

LOUIS FRANK JOHNSON.

Witnesses:
F. X. Leonard,
F. K. Caswell.

Copies of this patent may be obtained for five cents each, by addressing the "Commissioner of Patents, Washington, D. C."